US008103901B2

(12) United States Patent
Fujibayashi

(10) Patent No.: US 8,103,901 B2
(45) Date of Patent: *Jan. 24, 2012

(54) METHOD AND APPARATUS FOR SEAMLESS MANAGEMENT FOR DISASTER RECOVERY

(75) Inventor: Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,053

(22) Filed: Nov. 29, 2010

(65) Prior Publication Data

US 2011/0173487 A1    Jul. 14, 2011

Related U.S. Application Data

(63) Continuation of application No. 12/652,408, filed on Jan. 5, 2010, now Pat. No. 7,865,768, which is a continuation of application No. 11/904,061, filed on Sep. 25, 2007, now Pat. No. 7,661,019, which is a continuation of application No. 11/471,118, filed on Jun. 19, 2006, now Pat. No. 7,290,167, which is a continuation of application No. 11/228,859, filed on Sep. 16, 2005, now Pat. No. 7,191,358, which is a continuation of application No. 10/387,188, filed on Mar. 11, 2003, now abandoned.

(51) Int. Cl.
*G06F 11/00* (2006.01)
(52) U.S. Cl. ......... 714/6.1; 714/6.23; 714/6.3; 714/6.31
(58) Field of Classification Search .................. None
See application file for complete search history.

(56) References Cited

U.S. PATENT DOCUMENTS

| 4,686,623 | A | | 8/1987 | Wallace |
| 5,274,645 | A | * | 12/1993 | Idleman et al. ............... 714/6.1 |
| 5,276,867 | A | | 1/1994 | Kenley et al. |
| 5,459,857 | A | | 10/1995 | Ludlam et al. |
| 5,511,177 | A | | 4/1996 | Kagimasa et al. |
| 5,544,347 | A | | 8/1996 | Yanai et al. |
| 5,548,724 | A | | 8/1996 | Akizawa et al. |
| 5,737,745 | A | | 4/1998 | Matsumoto et al. |
| 5,870,537 | A | | 2/1999 | Kern et al. |
| 5,893,919 | A | | 4/1999 | Sarkozy et al. |
| 5,933,653 | A | | 8/1999 | Ofek |
| 5,943,688 | A | | 8/1999 | Fisher et al. |

(Continued)

OTHER PUBLICATIONS

"Managing Resource Definitions in Distributed Systems," IBM Technical Disclosure Bulletin pp. 81-84 (Dec. 1995).

(Continued)

*Primary Examiner* — Marc Duncan
(74) *Attorney, Agent, or Firm* — Mattingly & Malur, PC

(57) ABSTRACT

A method, apparatus, article of manufacture, and system are presented for establishing redundant computer resources. According to one embodiment, in a system including a plurality of processor devices and a plurality of storage devices, the processor devices, the storage devices and the management server being connected via a network, the method comprises storing device information relating to the processor devices and the storage devices and topology information relating to topology of the network, identifying at least one primary computer resource, selecting at least one secondary computer resource suitable to serve as a redundant resource corresponding to the at least one primary computer resource based on the device information and the topology information, and assigning the at least one secondary computer resource as a redundant resource corresponding to the at least one primary computer resource.

20 Claims, 12 Drawing Sheets

U.S. PATENT DOCUMENTS

| | | | |
|---|---|---|---|
| 5,978,565 | A | 11/1999 | Ohran et al. |
| 5,999,712 | A | 12/1999 | Moiin et al. |
| 6,035,306 | A | 3/2000 | Lowenthai et al. |
| 6,038,677 | A | 3/2000 | Lawlor et al. |
| 6,061,807 | A | 5/2000 | Albert |
| 6,105,118 | A | 8/2000 | Maddalozzo et al. |
| 6,173,420 | B1 | 1/2001 | Sunkara et al. |
| 6,199,074 | B1 | 3/2001 | Kern et al. |
| 6,216,211 | B1 | 4/2001 | McBrearty et al. |
| 6,195,732 | B1 | 7/2001 | Adams et al. |
| 6,269,431 | B1 | 7/2001 | Dunham |
| 6,324,654 | B1 | 11/2001 | Wahl et al. |
| 6,366,987 | B1 | 4/2002 | Tzelnic et al. |
| 6,393,485 | B1 | 5/2002 | Chao et al. |
| 6,425,049 | B1 | 7/2002 | Yamamoto et al. |
| 6,438,705 | B1 | 8/2002 | Chao et al. |
| 6,560,617 | B1 | 5/2003 | Winger et al. |
| 6,564,336 | B1 | 5/2003 | Majkowski |
| 6,597,862 | B1 | 7/2003 | Saeki et al. |
| 6,606,643 | B1 | 8/2003 | Emens et al. |
| 6,618,819 | B1 | 9/2003 | Adamovits et al. |
| 6,633,955 | B1 | 10/2003 | Yin et al. |
| 6,654,912 | B1 | 11/2003 | Viswanathan et al. |
| 6,665,780 | B1 | 12/2003 | Bradley |
| 6,691,245 | B1 | 2/2004 | DeKoning et al. |
| 6,694,447 | B1 | 2/2004 | Leach et al. |
| 6,728,897 | B1 | 4/2004 | Cramer et al. |
| 6,745,341 | B1 | 6/2004 | Onitsuka et al. |
| 6,785,678 | B2 | 8/2004 | Price |
| 6,792,557 | B1 | 9/2004 | Takamoto et al. |
| 6,820,098 | B1 | 11/2004 | Ganesh et al. |
| 6,859,889 | B2 | 2/2005 | Matsuura et al. |
| 6,907,543 | B2 | 6/2005 | Hino et al. |
| 7,076,691 | B1 | 7/2006 | Dobberpuhl et al. |
| 7,290,167 | B2* | 10/2007 | Fujibayashi ............... 714/6.22 |
| 2001/0044807 | A1 | 11/2001 | Kleiman et al. |
| 2001/0056461 | A1 | 12/2001 | Kampe et al. |
| 2002/0004857 | A1 | 1/2002 | Arakawa et al. |
| 2002/0007445 | A1 | 1/2002 | Blumenau et al. |
| 2002/0095549 | A1 | 7/2002 | Matsunami et al. |
| 2002/0188711 | A1 | 12/2002 | Meyer et al. |
| 2003/0046602 | A1 | 3/2003 | Hino et al. |
| 2003/0182593 | A1 | 9/2003 | Emberty et al. |
| 2003/0204597 | A1 | 10/2003 | Arakawa et al. |
| 2003/0233518 | A1 | 12/2003 | Yamagami et al. |
| 2004/0019822 | A1 | 1/2004 | Knapp |
| 2004/0030768 | A1 | 2/2004 | Krishnamoorthy et al. |
| 2004/0030851 | A1 | 2/2004 | Ohran et al. |
| 2004/0054780 | A1 | 3/2004 | Romero |
| 2004/0073831 | A1 | 4/2004 | Yanai et al. |
| 2004/0078397 | A1 | 4/2004 | Mehta et al. |
| 2004/0098637 | A1 | 5/2004 | Duncan et al. |
| 2004/0225659 | A1 | 11/2004 | O'Brien et al. |
| 2004/0225775 | A1 | 11/2004 | Pellegrino et al. |
| 2004/0230863 | A1 | 11/2004 | Buchhorn |
| 2005/0060330 | A1 | 3/2005 | Koji et al. |
| 2005/0192956 | A1 | 9/2005 | Evans |
| 2005/0268160 | A1 | 12/2005 | Taylor et al. |
| 2007/0038887 | A1 | 2/2007 | Witte et al. |

OTHER PUBLICATIONS

"Methodolgy for Profile Replication," IBM Technical Disclosure Bulletin (Nov. 1992).

Alvarez et al. "MINERVA: an automated resouce provisioning tool for large-scale storage systems," ACM Transactions on Computer Systems 19:483-518 (2001).

Clarke "Technical Introduction to Oracle Fail Safe, A Guide to Concepts and Terminology," An Oracle Technical White Paper (2001).

The Authoritative Dictionary of IEEE Standards Terms, 2000, IEEE Press, Seventh Edition, p. 941.

* cited by examiner

| ID | Server | Application | Related mount point | Related Volume ID | DG ID | Block device | LU Binding ID | SCSI ID | SCSI LUN |
|---|---|---|---|---|---|---|---|---|---|
| 1 | Server A | DB | /u01 | Vol1 | 0 | c2t2d1 | 1 | 2 | 1 |
| | | | /u02 | Vol2 | 1 | c2t3d1 | 2 | 3 | 1 |
| | | | /u03 | Vol3 | 2 | c3t4d2 | 3 | 4 | 2 |
| 2 | Server A | File service | /u05 | - | - | c3t4d3 | 4 | 4 | 3 |
| | | | /u06 | - | - | c3t4d4 | 5 | 4 | 4 |
| ... | ... | ... | ... | ... | ... | ... | ... | ... | ... |

| Binding ID | SCSI ID | LUN | Inquiry Information |
|---|---|---|---|
| 1 | 2 | 1 | Vendor D, Storage D, Volume ID 1 |
| 2 | 3 | 1 | Vendor D, Storage D, Volume ID 2 |
| 3 | 4 | 2 | Vendor D, Storage D, Volume ID 2 |

| Local SAN ID | Discovery ID | Device Type | Device Information | IP Address | Area/Global Position |
|---|---|---|---|---|---|
| 1 | 1 | Server | Vendor A, Server A | 100.100.100.100 | SD Latitude xxxxN Longitude xxxxW |
| 1 | 2 | Server | Vendor B, Server B | 100.100.100.101 | SD Latitude xxxxN Longitude xxxxW |
| 1 | 3 | FC Switch | Vendor C, Switch C | 100.100.100.102 | SD Latitude xxxxN Longitude xxxxW |
| 1 | 4 | Disk Subsystem | Vendor D, Storage D | 100.100.100.103 | SD Latitude xxxxN Longitude xxxxW |
| 2 | 1 | Server | Vendor A, Server C | 120.100.100.105 | SF Latitude xxxxN Longitude xxxxW |
| 2 | 2 | Disk Subsystem | Vendor D, Storage H | 120.100.100.106 | SF Latitude xxxxN Longitude xxxxW |
| 2 | 3 | FC Switch | Vendor C, Switch G | 120.100.100.107 | SF Latitude xxxxN Longitude xxxxW |

| Local SAN ID | Discovery ID | Function Type | Device Information |
|---|---|---|---|
| 1 | 1 | Host-based Remote mirroring | Vendor A, Server A, enterprise-class |
| 1 | 2 | Storage-based Remote Mirroring | Vendor B, Storage B, mid-range |
| 1 | 3 | Storage-based Remote Mirroring | Vendor C, Storage C, mid-range |
| 1 | 4 | Storage-base Remote Mirroring | Vendor D, Storage D, enterprise-class |
| 2 | 1 | Storage-base Remote Mirroring | Vendor D, Storage H, enterprise-class |
| 2 | 2 | Host-based Remote Mirroring | Vendor K, server C, enterprise-class |

| SERVER | | | LOCAL NETWORK | | | | INTERCONNECT | LOCAL NETWORK | | | | STORAGE | | |
|---|---|---|---|---|---|---|---|---|---|---|---|---|---|---|
| SERVER NAME | BINDING ID | HOST PORT ID | SWITCH NAME | SWITCH PORT ID | SWITCH NAME | SWITCH PORT ID | | SWITCH NAME | SWITCH PORT ID | SWITCH NAME | SWITCH PORT ID | STORAGE NAME | DISK PORT ID | VOLUME ID |
| SERVER A | LU1 | a1 | SW C | s1 | SW C | s4 | | | | | | STORAGE D | d1 | V1 |
| SERVER A | LU2 | a2 | SW C | s2 | SW C | s4 | | | | | | STORAGE D | d1 | V2 |
| SERVER A | LU3 | a2 | SW C | s2 | SW C | s4 | | | | | | STORAGE D | d1 | V3 |
| SERVER B | LU1 | b1 | SW C | s3 | SW C | s4 | | | | | | STORAGE D | d1 | V1 |
| SERVER C | LU1 | c1 | SW G | g1 | SW G | g2 | SF-SD | | g3 | SW C | s5 | STORAGE H | h1 | V1 |
| | | | | | SW C | s6 | | SW C | s6 | SW G | g4 | STORAGE D | d2 | |
| | | | | | | | | SW G | g3 | | | STORAGE D | d1 | |

| ID (610) | GROUP ID (612) | GROUP NAME (614) | PRIMARY HOST LIST (616) | PRIMARY VOLUME VOLUME ID | PRIMARY VOLUME SUBSYSTEM ID | SECONDARY HOST LIST (618) | SECONDARY VOLUME#1 VOLUME ID | SECONDARY VOLUME#1 SUBSYSTEM ID | CLUSTER CONFIG ID (620) |
|---|---|---|---|---|---|---|---|---|---|
| 1 | 1 | OraDB | HOST A / xxx.xxx.xxx.xxx | 1 | 2022345 | HOST C / xxx.xxx.xxx.xxx | 1 | 3004567 | 1 |
|  |  |  |  | 2 | 2022345 |  | 2 | 3004567 | 1 |
|  |  |  |  | 3 | 2022345 |  | 3 | 3004567 | 1 |
| 2 | ... |  |  |  |  |  |  |  |  |

FIG. 6D (622)

| VALID (624) | ID (626) | GRP ID (628) | GRP NAME (630) | PRIMARY HOST LIST | PRIMARY LOGICAL VOLUME ID | PRIMARY DG ID | PRIMARY BLOCK DEVICE | PRIMARY VOL. ID | PRIMARY SUBSYSTEM ID (632) | SECONDARY HOST LIST | SECONDARY LOGICAL VOLUME ID#/NAME | SECONDARY DG ID#/NAME (634) | SECONDARY BLOCK DEVICE | SECONDARY VOLUME ID | SECONDARY VOLUME# SUBSYSTEM ID | CLUSTER CONFIG ID (636) |
|---|---|---|---|---|---|---|---|---|---|---|---|---|---|---|---|---|
| 1 | 1 | 1 | FSGr | HOST B / xxx.xx.xxxx.xxx | 1/VOL1 | 1/DG1 | C210d0 | 1 | 2022345 | HOST C / xxx.xxx.xx.xxxx | 2/VOL2 | 1/DG1 | C210c3 | 3 | 3004567 | 1 |
| 2 | ... |  |  |  |  |  |  |  |  |  |  |  |  |  |  |  |

FIG. 6E — 638

| ID | VALID | CLUSTER ID / NAME | CLUSTER TYPE / VENDOR | MEMBER NODE LIST | HEARTBEAT LIST | HEARTBEAT CONFIGURATION ID LIST | REPLICATION TYPE LIST | REPLICATION CONFIGURATION ID LIST |
|---|---|---|---|---|---|---|---|---|
| 1 | 1 | 1 / CLUS1 | XX CLUSTER SERVER / VENDOR A | HOST A / XXX.XXX.XXX.XXX<br>HOST C / XXX.XXX.XXX.XXX | 1 / PRIVATE-LAN<br>2 / STORAGE-BASED HB | 1<br>2 | HOST-BASED<br>STORAGE-BASE | 1 |
| 2 | 0 | 2 / CLUS2 | YY CLUSTER SERVER / VENDOR C | HOST B / XXX.XXX.XXX.XXX<br>HOST D / XXX.XXX.XXX.XXX | 1 / PRIVATE-LAN | HOST-BASED | HOST-BASED | 2 |
| 3 | 1 | ... | ... | ... | ... | ... | ... | ... |

| ID | VALID | CLUSTER TYPE ID | CLUSTER TYPE / VENDOR | RESOURCE GRP ID | RESOURCE GRP NAME | MEMBER NODE LIST | RESOURCE LIST | REPLICATION TYPE | REPLICATION CONFIG ID |
|---|---|---|---|---|---|---|---|---|---|
| 1 | 1 | 1 / XXX CLUSTER SEVER / VENDOR A | | 1 | DB_GRP | HOST A / XXX.XXX.XXX.XXX<br>HOST C / XXX.XXX.XXX.XXX | DB<br>NIC<br>IP<br>FS<br>DG<br>REPLICA | STORAGE-BASED | 1 |
| 2 | 0 | 2 / YYY CLUSTER SEVER / VENDOR C | | 2 | FS_GRP | HOST B / XXX.XXX.XXX.XXX<br>HOST C / XXX.XXX.XXX.XXX | NFS<br>NIC<br>IP<br>FS<br>DG<br>REPLICA | HOST-BASE | 2 |
| 3 | 1 | ... | | ... | ... | ... | ... | ... | ... |

660 662 664 666 668 670 672 674 676

METHOD AND APPARATUS FOR SEAMLESS MANAGEMENT FOR DISASTER RECOVERY

CROSS-REFERENCES TO RELATED APPLICATIONS

This application is a continuation application of U.S. patent application Ser. No. 12/652,408, filed Jan. 5, 2010 (now U.S. Pat. No. 7,865,768), which is a continuation of U.S. patent application Ser. No. 11/904,061, filed Sep. 25, 2007 (now U.S. Pat. No. 7,661,019), which is a continuation of U.S. patent application Ser. No. 11/471,118, filed on Jun. 19, 2006 (now U.S. Pat. No. 7,290,167), which is a continuation of U.S. patent application Ser. No. 11/228,859, filed on Sep. 16, 2005 (now U.S. Pat. No. 7,191,358), which is a continuation of U.S. patent application Ser. No. 10/387,188, filed on Mar. 11, 2003 (abandoned), the entire disclosures of which are incorporated herein by reference.

BACKGROUND OF THE INVENTION

This invention is generally related to the field of clustering systems and remote mirroring technology.

The use of clustering systems to accomplish fault-tolerance and/or load-balancing is becoming increasingly popular. Generally speaking, a clustering system may provide redundant resources so that if one portion of the system experiences failure, another portion can take over affected tasks or otherwise provide recovery from the failure. Also, a clustering system may use its redundant resources to process tasks in a more distributed manner, allowing different portions of the system to work inparallel in accomplishing tasks.

A typical clustering system may be made up of two or more nodes, each having its own processing and storage capabilities. In one particular use of a clustering system, a primary node may comprise of a server and associated storage devices, while a secondary node may also comprise of another server and associated storage devices. The secondary node may be created to be similar to the primary node, in terms of processing, storage, and other capabilities. Here, the clustering system may maintain exact correspondence between the data storage of the primary node and the data storage of the secondary node, such that any write or read to data storage at the primary node is replicated at the secondary node. If the primary node fails as it performs its various tasks, the secondary node may take over the tasks performed by the primary node. For example, if a web server that is configured as a primary node in a clustering system fails for some reason, a secondary node may take over and serve web server functions in place of the failed primary node. A web site supported by such a system thus continues to operate with little or no down time. Web site visitors may continue to visit the associated web site as if no failure had occurred. In this example, providing a primary and a secondary node of similar capabilities allows the secondary node to be capable of taking over the tasks previously performed by the primary node.

In other situations, the secondary node may have lesser capabilities than the primary node. For example, if the secondary node is only designed to temporarily take over the tasks of the primary node, or if the secondary node is only designed to record periodic snap shots of the data storage of the primary node, it may be sufficient to create the secondary node with lesser capabilities. This may be especially true if the cost associated with creating a similarly capable secondary node is to be avoided, or if failure of the primary node is not expected to extend beyond a certain amount of time. Thus, depending on the situation, the required capabilities of the secondary node may vary.

The correspondence between the data storage of a primary node and the data storage of a secondary node storage may also be referred to as remote mirroring. This is especially the case if the data storage of the primary node is at a geographically distant location from the data storage of the secondary node. Remote mirroring may be carried out by different portions of a system. For example, in host-based remote mirroring, a host, such as a server, may be principally responsible for maintaining the correspondence between the data storage of the primary node and the data storage of the secondary node. In storage-based remote mirroring, a storage system, such as a storage area network (SAN), may be principally responsible for maintaining such correspondence. Depending on the implementation, remote mirroring may require separate software and equipment installation and/or configuration, in addition to that required by other parts of the clustering system.

Currently, in order to realize the many advantages of a clustering system, the multiple nodes of a clustering system must be established by a system administrator. For example, in a clustering system having a primary and a secondary node, the system administrator must decide exactly what should be the processing, storage, and other capabilities of the secondary node, install or identify available resources meeting those capabilities, install required software, and perform necessary configurations to set up the clustering system. These steps involve factors that can be overwhelmingly complex and difficult to analyze for the system administrator, even if that person is an expert. Thus, the administrator may only be able to make a rough guess, in an ad hoc manner, as to what storage capability is needed for the secondary node. As discussed above, the required storage capability of the secondary node may vary from situation to situation, and it may not always be ideal to simply mimic the storage capability of the primary node.

Furthermore, after the desired processing, storage, and other capabilities of the secondary node is decided, the administrator must go about looking for existing equipment in the system that fit the description, or install such equipment. In a large system having many different components, it may be extremely difficult and time-consuming for an administrator to search through all available resources in order to find the appropriate equipment. Finally, after the appropriate resources are decided and located, software installation and configuration may take additional time and effort. Thus, while clustering systems provide import fault-tolerance and/or load-balancing capabilities, the deployment of clustering systems remains largely a difficult and imprecise undertaking.

BRIEF SUMMARY OF THE INVENTION

The present invention provides a method, apparatus, article of manufacture, and system for establishing redundant computer resources. According to one embodiment, in a system including a plurality of processor, a plurality of storage devices, and a management server connected via a network, the method comprises storing device information relating to the processor devices and the storage devices and topology information relating to topology of the network, identifying at least one primary computer resource, the at least one primary computer resource including at least one primary processor device and at least one portion of storage implemented in at least one primary storage device, selecting at least one secondary computer resource suitable to serve as a redundant resource corresponding to the at least one primary computer resource based on the device information and the topology information, the at least one secondary computer resource including at least one secondary processor device and at least one portion of storage implemented in at least one secondary storage device, and assigning the at least one secondary computer resource as a redundant resource corresponding to the at least one primary computer resource.

If the at least one primary storage device has storage-based remote mirroring function, the at least one secondary computer resource may be selected such that the at least one secondary storage device also has storage-based remote mirroring function and is accessible from the at least one primary storage device.

In one embodiment, the at least one secondary computer resource is selected based on at least one user-specified policy, which may include performance of the at least one secondary computer resource, reliability of the at least one secondary computer resource, and/or cost of the at least one secondary computer resource.

In another embodiment, the step for selecting the at least one secondary computer resource comprises the steps of selecting at least one candidate suitable to serve as a redundant resource corresponding to the at least one primary computer resource, presenting the at least one candidate to a user, and receiving input from the user indicating selection, from the at least one candidate, of the at least one secondary computer resource.

BRIEF DESCRIPTION OF THE DRAWINGS

FIG. 2 is an illustration of a mapping table.

FIG. 3 is an illustration of a logical unit number (LUN) binding table.

FIG. 4A is an illustration of a discovery list.

FIG. 4B is an illustration of a functional discovery list that may be maintained in addition to or in place of the discovery list shown in FIG. 4A.

FIG. 5 is an illustration of a topology table.

FIG. 6C illustrates a storage-based replication configuration table.

FIG. 6D illustrates a host-based replication configuration table.

FIG. 6E illustrates a cluster configuration table.

FIG. 6F illustrates a cluster resource group configuration table.

DETAILED DESCRIPTION OF THE INVENTION

Clustering System

Figure 1:
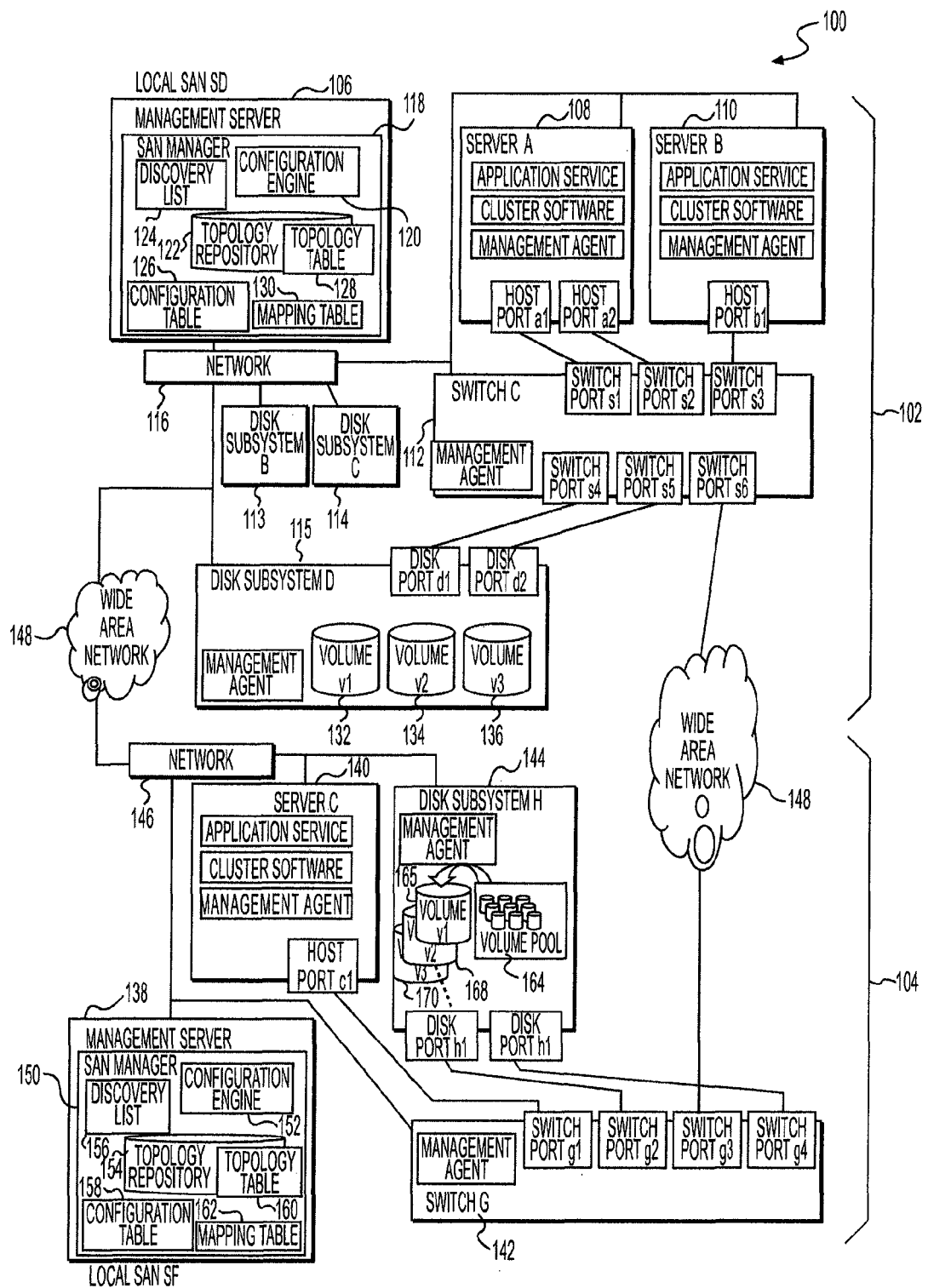
FIG. 1 is a block diagram of a clustering system in accordance with at least one embodiment of the present invention.

FIG. 1 is a block diagram of a clustering system 100 in accordance with at least one embodiment of the present invention. Here, clustering system 100 is comprised of equipment found in at least two geographically distinct locations 102 and 104. For example, location 102 may be a metropolitan area such as San Diego, Calif., and location 104 may be a different metropolitan area such as San Francisco, Calif. At location 102, a management server 106 is responsible for monitoring, configuring, and otherwise managing servers 108 and 110, network equipment 112, and storage equipment 113, 114, and 115. Management server 106, servers 108 and 110, network equipment 112, and storage equipment 113, 114, and 114 communicate through a local network 116, forming a local SAN.

As shown, management server 106 includes a SAN manager 118 that includes a configuration engine 120 and a topology repository 122. SAN manager 118 also maintains a discovery list 124, a configuration table 126, a topology table 128, and a mapping table 130, which are discussed in further detail below. SAN manager 118 maintains this information by communicating with various management agents located in servers 108 and 110, network equipment 112, and storage equipment 113, 114, and 115. SAN manager 118 and the various management agents may be implemented in software.

Server 108 may include one or more application programs. These application programs may be server level applications such as Web server applications, network file sharing applications, and others. As FIG. 1 illustrates, server 108 may also include clustering software for maintaining a clustering system, a management agent, and a number of host ports. Server 110 is similarly arranged and may also include one or more application programs, clustering software, a management agent, and a number of host ports.

Network equipment 112 is illustrated in FIG. 1 as a switch having a number of switch ports. Network equipment 112 also includes a management agent. Network equipment 112 facilitates communication through local network 116. As shown, network equipment 112 provides communication between servers 108 and 110 and storage equipment 115.

Storage equipment 115 may include a number of disk ports, a number of logical volumes 132, 134, and 136, and a management agent. Here, each of the logical volumes 132, 134, and 136 may be implemented in different ways, such as by use of various types of redundant array of independent disks (RAID). Each of logical volumes 132, 134, 136 may be implemented on a single physical disk (not shown), across multiple physical disks (not shown) within a disk group (not shown), across disks in multiple disk groups, or in some other arrangement.

Here, server 108, network equipment 112, and storage equipment 115 may represent a primary node in a clustering system. For example, server 108 may be executing a database application, using storage equipment 115 to store the associated databases and communicating data to and from storage equipment 115 through network equipment 112. Fault-tolerance for this database service may be realized by creating a secondary node corresponding to the primary node. Use of equipment located at a geographically distinct location, such as location 104, would provide effective fault-tolerance because if a catastrophic local event damages equipment at location 102, redundant equipment at location 104 would be able to provide effective recovery.

At location 104, a management server 138 is responsible for monitoring, configuring, and otherwise managing a server 140, network equipment 142, and storage equipment 144. Management server 138, server 140, network equipment 142, and storage equipment 144 communicated through a local network 146, forming a local SAN. Local SANs at locations 102 and 104, and perhaps other local SANs, may together form a wide area SAN by communicating over one or more wide area networks 148.

As shown, management server 138 includes a SAN manager 150 that includes a configuration engine 152 and a topology repository 154. SAN manager 150 also maintains a discovery list 156, a configuration table 158, a topology table 160, and a mapping table 162, which are discussed in further detail below. SAN manager 150 maintains this information by communicating with various management agents located in server 140, network equipment 142, and storage equipment 144. SAN manager 150 and the various management agents may be implemented in software.

Server 140 may include one or more application programs, clustering software for maintaining a clustering system, a management agent, and a number of host ports. Network equipment 142 is illustrated in FIG. 1 as a switch having a number of switch ports. Network equipment 142 also includes a management agent. Network equipment 142 facilitates communication through local network 146. As shown, network equipment 142 provides communication between server 140 and storage equipment 144.

Storage equipment 144 may include a number of disk ports, a pool 164 of logical volumes, from which logical volumes 166, 168, and 170 may be selected, and a management agent. Here, each of the logical volumes in logical volume pool 164, including logical volumes 166, 168, and 170, may be implemented in different ways, such as by use of various types of redundant array of independent disks (RAID). Thus, each of the logical volumes may be implemented on a single physical disk (not shown), across multiple physical disks (not shown) within a disk group (not shown), across disks in multiple disk groups, or in some other arrangement.

Here, server 140, network equipment 142, and storage equipment 144 may be used to form a secondary node associated with the previously discussed primary node in the clustering system. For example, if the clustering system is designed to provide a secondary node having similar processing, storage, and other capabilities as those of the primary node, it would be desirable to identify a secondary node having similar equipment as the primary node. Server 140, network equipment 142, and storage equipment 144 may fit such requirements. The present invention allows equipment such as server 140, network equipment 142, and storage equipment 144 to be identified as resources that may be used to form the secondary node.

Servers 108, 110, and 140 are examples of processor devices, storage equipment 115 and 144 are examples of storage devices, and network equipment 112 and 142 are examples of network interface devices.

Information Maintained at Management Server and Elsewhere

FIG. 2 is an illustration of mapping table 130 maintained in management server 106 of FIG. 1. Mapping table 130 is illustrated here as an example. Other mapping tables, such as mapping table 162 maintained in management server 138, may have similar formats. As shown in FIG. 2, mapping table 130 provides a mapping between application programs being executed and the location(s) of data storage being utilized by such application programs. For instance, an application program executing in server 108 may utilize logical volumes 132, 134, and 136 in storage equipment 115, and mapping table 130 would register such utilization in detail. Different methods may be used to identify the various application programs executing in a particular server. One such method involves using the Common Information Model (CIM) standard, which allows application programs executing in a server may communicate with one another. For example, the management agent in server 108 may use the CIM standard to communicate with, and thereby identify, the various application programs executing in server 108. Another method involves using repository information maintained by the operating system of the server. For example, the management agent in server 108 may retrieve data from the repository information of the operating system of server 108 to identify various application program executing in server 108.

Mapping table 130 is shown to include the following categories of information: ID 202, Server 204, Application 206, Related Mount Point 208, Related Volume ID 210, Disk Group (DG) ID 212, Block Device 214, Logical Unit (LU) Binding ID 216, Small Computer System Interface (SCSI) ID 218, and SCSI Logical Unit Number (LUN) 220. Here, table 130 indicates that a database (DB) application is executing in Server A (server 108). Table 130 further indicates that this DB application is utilizing logical volumes Vol1, Vol2, and Vol3 (logical volumes 132, 134, and 136). For each of these three logical volumes, table 130 provides additional information. Taking Vol1 just as an example, table 130 indicates the mount point (/u01) at which Vol1 is associated with, or "mounted" to, the system executing the DB application. Table 130 also indicates the physical disk group (0) and block device (c2t2d1) in which Vol1 is implemented. In this example, logical volumes are also associated with SCSI IDs, as well as LUNs within particular SCSI IDs. Here, Vol1 is shown to be associate with a particular SCSI ID (2) and a particular SCSI LUN (1).

FIG. 3 is an illustration of a LUN binding table 300 maintained in server 108 of FIG. 1. LUN binding table 300 is illustrated here as an example. Other LUN binding tables maintained in other servers, such as servers 110 and 140, may have similar formats. LUN binding table 300 indicates the SCSI ID assignment and LUN assignment associated with location(s) of data storage being utilized by application programs executing in server 108. LUN binding table 300 is shown to include the following categories of information: Binding ID 302, SCSI ID 304, LUN 306, and Inquiry Information 308. Each Binding ID 302 indicates a particular location of storage and is associated with a particular SCSI ID 304 and a particular LUN 306. Also, each Binding ID 302 further indicates Inquiry Information 308, which can provide additional data such as vendor, storage type, and logical volume information. Binding table 300 may be maintained as a part of the operation of the management agent in server 108. Thus, individual binding tables maintained at various servers, such as servers 108 and 110, may be used to form the mapping table 130 shown in FIG. 2.

FIG. 4A is an illustration of discovery list 124 maintained in management server 106 of FIG. 1. Discovery list 124 is illustrated here as an example. Other discovery lists, such as discovery list 156 maintained in management server 138, may have similar formats. As shown in FIG. 4, discovery list 124 provides a listing of devices available at various locations, such as locations 102 and 104. Discovery list 124 shows the following categories of information for each device: Local SAN ID 402, Discovery ID 404, Device Type 406, Device Information 408, IP address 410, and Area/Global Position 412. Local SAN ID 402 identifies the local SAN to which the device belongs. Discovery ID 404 identifies a numerical order for the device within its local SAN. Device Information 408 may indicate various information relating to the device, such as vendor and device type. IP address 410 indicates the IP address assigned to the device. Area/Global Position 412 provides information relating to the location of the device, such as name of metropolitan area, longitude, and latitude. Thus, discovery list 124 allows management server 106 to identify available devices at various locations, including distant locations, that may be potential resources suitable to serve as part of a secondary node corresponding a primary node in a clustering system.

FIG. 4B is an illustration of a functional discovery list 440 that may be maintained in management server 106 of FIG. 1, in addition to or in place of discovery list 124. Functional discovery list 440 is illustrated here as an example. Other discovery lists maintained in other management servers may have similar formats. As shown in FIG. 4B, functional discovery list 440 provides a listing of devices available at various locations, such as locations 102 and 104. Functional discovery list 440 shows the following categories of information for each device: Local SAN ID 442, Discovery ID 444, Function Type 446, and Device Information 448. Local SAN ID 442 identifies the local SAN to which the device belongs. Discovery ID 444 identifies a numerical order for the device within its local SAN. Function Type 446 provides information on the possible function of the device, such as use in host-based remote mirroring or storage-based remote mirroring. Device Information 448 may indicate various information relating to the device, such as vendor, device type, and device class. Functional discovery list 440 allows management server 106 to identify available devices at various locations, including distant locations, that may be potential resources suitable to serve as part of a secondary node corresponding a primary node in a clustering system.

FIG. 5 is an illustration of topology table 128 maintained in management server 106 of FIG. 1. Topology table 128 is illustrated here as an example. Other topology tables, such as topology table 160 maintained in management server 138, may have similar formats. As shown in FIG. 5, topology table 128 provides a summary of interconnections over which data may be sent in system 100. Topology table 128 shows the following categories of information: server information 502, first local network information 504, interconnect information 506, second local network information 508, and storage information 510. Topology table 128 depicts the manner by which various networking and storage equipment are linked, including local and wide area network connections. Here, topology table 128 is shown to be focused on storage network topology for purposes of illustration. Other types of topology information may be included as well.

FIGS. 6A-6G show various configuration tables that may be implemented, individually or in combination, as the contents of configuration table 126 maintained in management server 106 of FIG. 1. Contents of configuration table 126 is illustrated here as examples. Other configuration tables, such as configuration table 158 maintained in management server 138, may have similar formats.

Figure 6A:
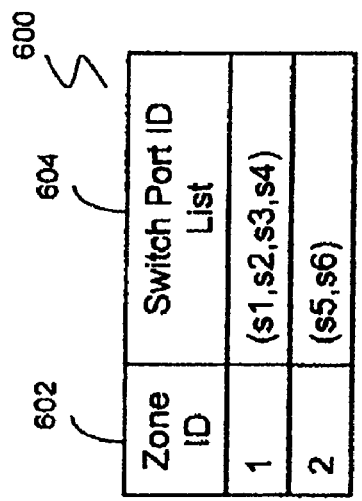
FIG. 6A illustrates a fibre channel switch (FC-SW) zoning configuration table.
Figure 6B:
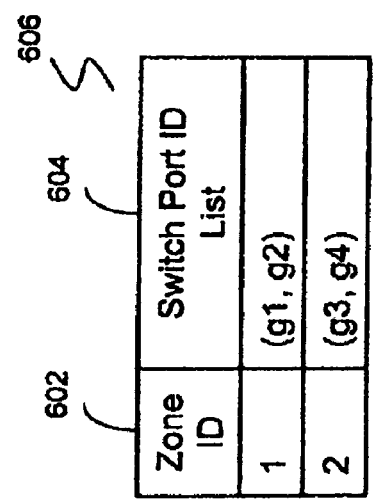
FIG. 6B illustrates a different FC-SW zoning configuration table.

FIG. 6A illustrates a fibre channel switch (FC-SW) zoning configuration table 600. This table contains categories of information including Zone ID 602 and Switch Port ID List 604. Zone ID 602 identifies different zones, or groupings of devices, such that devices within a common zone may readily communicate with one another. Switch Port ID List 604 identifies the different network ports which belong to the identified zone. FIG. 6B illustrates a different FC-SW zoning configuration table 606, similar in structure to table 600. Zoning configuration tables 600 and 606 allow convenient separation of groups of devices. Here, tables 600 and 606 are described as fibre channel switch zoning configuration tables for purposes of illustration, other types of equipment may also be organized in similar zoning tables.

FIG. 6C illustrates a storage-based replication configuration table 608. This table identifies the configuration of storage-based data replication from a set of primary storage locations to a corresponding set of secondary storage locations. Here, the storage system is responsible of maintaining the proper replication of data. Table 608 shows the following categories of information: ID 610, Group ID 612, Group Name 614, primary storage information 616, secondary storage information 618, and Cluster Config ID 620. ID 610 is an entry identifier. Group ID 612 and Group Name 614 relate to the identification number and name for each group of storage resources, such as a group of volumes, representing a storage location. The primary and secondary storage information 616 and 618 each identifies the host and volume information associated with the relevant storage location. Cluster Config ID 620 identifies a label for the cluster corresponding to the primary and secondary storage locations.

FIG. 6D illustrates a host-based replication configuration table 622. This table identifies the configuration of host-based data replication from a set of primary storage locations to a corresponding set of secondary storage locations. Here, the host system is responsible of maintaining the proper replication of data. Table 622 shows the following categories of information: ID 624, Valid 626, Group ID 628, Group Name 630, primary storage location information 632, secondary storage location information 634, and Cluster Config ID 636. Valid 626 relates to whether the particular replication configuration is available. Also, primary and secondary storage location information 632 and 634 are each shown to also include information for identifying the corresponding disk group and block device. Other information in table 622 is similar to information shown in table 608 of FIG. 6C.

FIG. 6E illustrates a cluster configuration table 638. This table identifies the arrangement of various clusters in the system, which may include the configuration of physical devices being controlled by cluster software. Table 638 shows the following categories of information: ID 640, Valid 642, Cluster ID/Name 644, Cluster Type/Vender 646, Member Node List 648, Heartbeat List 650, Heartbeat Configuration ID List 652, Replication Type List 654, and Replication Configuration ID List 656. ID 640 identifies a numeric label for each entry, Valid 642 relates to whether the particular cluster is available. Cluster ID/Name 644 provides a number identifier and a name identifier for each cluster presented. Cluster Type/Vendor 646 identifies the classification of the cluster and vendor of the associated equipment. Member Node List 648 identifies the nodes that are members of the particular cluster. Heartbeat List 650 and Heartbeat Configuration 652 relate to arrangement of the heartbeat, which provides a signal that may be used to indicate whether a node, or particular resource at a node, is active. Replication Type List 654 and Replication Configuration ID List 656 relate to the type of replication available and the associated configuration label.

FIG. 6F illustrates a cluster resource group configuration table 658. This table identifies the various resources available at different clusters, which may include the configuration of the logical resource group for each node in each cluster. Such resources may be processing, communication, storage, or other types of resources. Table 658 shows the following categories of information: ID 660, Valid 662, Cluster Type ID 664, Resource Group ID 666, Resource Group Name 668, Member Node List 670, Resource List 672, Replication Type 674, and Replication Configuration ID 676. ID 660 provides an numerical label for each entry, Valid 662 relates to whether the particular cluster is available. Cluster Type ID 664 provides an identifier for the cluster and indicates the type and vendor of equipment associated with the cluster. Resource Group ID 666 and Resource Group Name 668 provide a number identifier and a name identifier for each collection of resources associated with the cluster. Resource List 672 identifies the particular resources available within the identified resource group. Replication Type 674 and Replication Config ID 676 relate to the type of replication available and the associated configuration label.

Figure 6G:
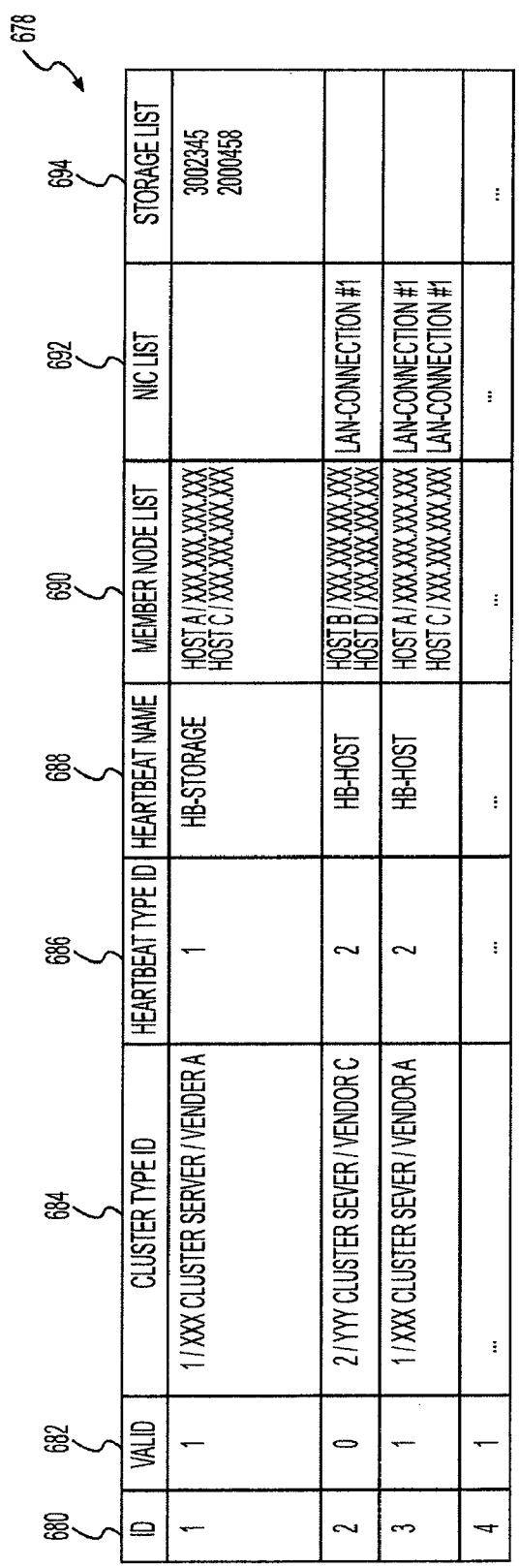
FIG. 6G illustrates a heartbeat configuration table.

FIG. 6G illustrates a heartbeat configuration table 678. This table identifies provides further detail on the arrangement of the heartbeat for each cluster. Table 678 shows the following categories of information: ID 680, Valid 682, Cluster Type ID 684, Heartbeat Type ID 686, Heartbeat Name 688, Member Node List 690, NIC List 692, and Storage List 694. ID 680 provides a numerical label for each entry. Valid 682 relates to whether the cluster is available. Cluster Type ID 684 provides an identifier for the cluster and indicates the type and vendor of equipment associated with the cluster. Heartbeat Type ID 686 and HeartBeat Name 688 identify the classification and name of the heartbeat utilized. For example, the heartbeat may be host-based or storage-based. Member Node List 690 identifies the nodes that are members of the particular cluster. NIC List 692 identifies NICs which correspond the to a particular host-base heartbeat. Storage list identifies storage systems which correspond to a particular storage-based heartbeat.

The information maintained at each management server may be communicated to other management servers. For example, although management servers 106 and 108 are situated at geologically distinct locations 102 and 104, respectively, they may exchange some or all of the information that is contained in various tables such as those discussed above.

Automatic Configuration

Figure 7:
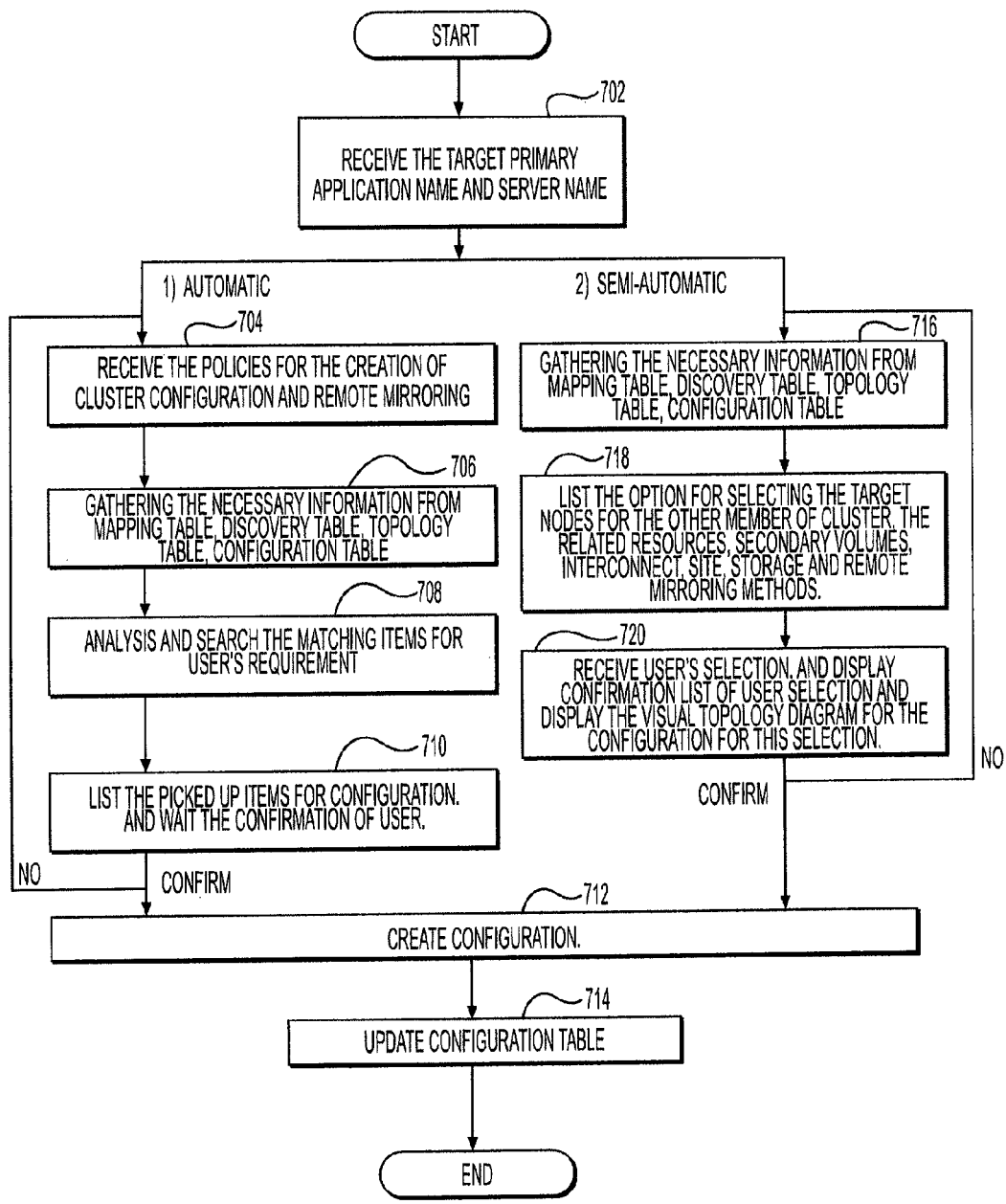
FIG. 7 is a flow chart summarizing the general steps involved in automatic configuration and semi-automatic configuration of a clustering system in accordance with at least one embodiment of the present invention.

FIG. 7 is a flow chart summarizing the general steps involved in automatic configuration and semi-automatic configuration of a clustering system in accordance with at least one embodiment of the present invention. The steps shown may be implemented as an integrated routine that allows the selection of either automatic configuration or semi-automatic configuration. Alternatively, the steps shown may be implemented as two separate routines. That is, a system may employ only automatic configuration, or only semi-automatic configuration. For purposes of illustration, FIG. 7 shows the establishment of a clustering system through the formation of a secondary node corresponding to a primary node. Different steps shown in FIG. 7 may be accomplished with use of a user interface, such as an interactive graphical user interface (GUI). Also, the GUI can be situated at any location, as long as the relevant information can be passed to the system. For example, the information submitted through the GUI by the user may be sent to the management server 106, or to the management server 138.

Under automatic configuration, establishment of a clustering system begins with step 702, in which the primary node of the planned clustering system is identified. This may involve identification, by the user, of the name of one or more target applications and the name of the target server corresponding to the primary node. Alternatively, a more automated process may be employed. For example, the main application executing in a target server may be selected.

Next, in step 704, policies for creating the clustering system, including remote mirroring features, may be specified. This step may involve specification by the user of general policies to follow in establishing the clustering system and importance assigned to such policies. For example, the user may be presented with three potential policies: (1) performance, (2) reliability, and (3) cost.

Performance may relate to the effectiveness of the data transfer between the data storage of the primary node and the data storage of the secondary node, which may involve measures of bandwidth, distance, and network usage in a wide area SAN covering metropolitan areas of San Francisco (SF) and San Diego (SD) are provided in the table below:

|       |              | Network   |       |
|       | Type         | Total     | Usage |
|-------|--------------|-----------|-------|
| SD    | Local        | 2 Gbps    | 50%   |
| SF-SD | Interconnect | 48 Gbps   | 10%   |
| SF    | Local        | 2 Gbps    | 8%    |

Illustrative measures of bandwidth, distance, and network usage in the same wide area SAN, but from the perspective of the San Diego (SD) metropolitan area, are provided in the table below:

|    |              | Tested     |           | Network  |       |
|    | Type         | Throughput | Distance  | Total    | Usage |
|----|--------------|------------|-----------|----------|-------|
| SF | interconnect | 500 Mbps   | 1000 mile | 48 Gbps  | 10%   |

Thus, if a user places emphasis on performance, the secondary node may be chosen to have equal performance as the primary node, in terms of processing capability (server type), storage capability (throughput, cache size, RAID level, etc.), and network interface capability (number and performance of host bus adaptors). Also if there are two or more option for interconnects between the primary device and secondary device, the interconnect that has more available throughput capacity may be chosen. For example, assume there are two interconnects: interconnect A, which has 48 Gbps total throughput capacity and 10% average usage rate (43.2 Gbps available throughput capacity), and interconnect B, which has 128 Gbps total throughput capacity and 80% average usage rate (25.6 Gbps available throughput capacity). Here, interconnect A has more available throughput capacity than interconnect B, so interconnect A may be chosen.

Reliability may relate to the level of confidence with which the data storage of the secondary node replicates data in the data storage of the primary node. If a user places emphasis on reliability the secondary node may be chosen to have redundant host bus adaptors and highly reliable, enterprise level storage, such as RAID level 1. Cost may relate to the cost of using equipment, such as maintenance costs. Cost may also relate to the cost of acquiring currently unavailable equipment. If a user places emphasis on cost, the secondary node may be chosen to have much lower performance than the primary node, in terms of processing capability (server type), storage capability (throughput, cache size, RAID level, etc.), and network interface capability (number and performance of host bus adaptors). For example, storage equipment of RAID level 5 may be chosen.

Thus, by specifying general policies such as (1) performance, (2) reliability, and (3) cost, to follow in establishing the clustering system, the user is able control the design of the clustering system, without being required to decipher the detailed considerations relating to technical specifications of related equipment and software. The user may be presented with various general policies from which to choose. The user may specify policies by simply identifying particular policies as important. The user may also specify policies by assigning importance, or weight, to particular policies. This may be done in different ways, such as by user input of ratings, ratios, percentages, or other measures for different policies.

The next step under automatic configuration is step 706, in which information on the current system is gathered. Such information may include the contents of mapping tables, discovery tables, topology tables, and configuration tables. This information provides a detailed picture of the various aspects of the current system, including the mapping from applications to resources they utilize, available resource and their configurations, and so on.

In step 708, the information on the current system gathered in step 706 is analyzed to select the most appropriate resources and/or arrangements to be used for creating the secondary node. This is done in view of the various policies, and possibly weights assigned to those policies, as defined by the user in step 704. In step 710, the selected resources and/or arrangements are presented to the user, and the user is given to opportunity to confirm the selection of resources and/or arrangements. If the user confirms the selection, the process continues with step 712, discussed below. If the user does not confirm the selection, the process loops back to step 704.

In step 712, the selected resources and/or arrangements are used to create the secondary node. If the selected resources need additional software installation or configuration in order to function properly as the secondary node, such installation or configuration may be performed. Alternatively, the automatic configuration routine or semi-automatic configuration routine may re-select from resources that do not require additional software installation or configuration. Also, default resources that do not require additional software installation or configuration may also be selected in order to avoid such installation or configuration of software. Finally, in step 714, the configuration table(s) are updated to include information on the secondary node just created.

Semi-Automatic Configuration

Figure 8:
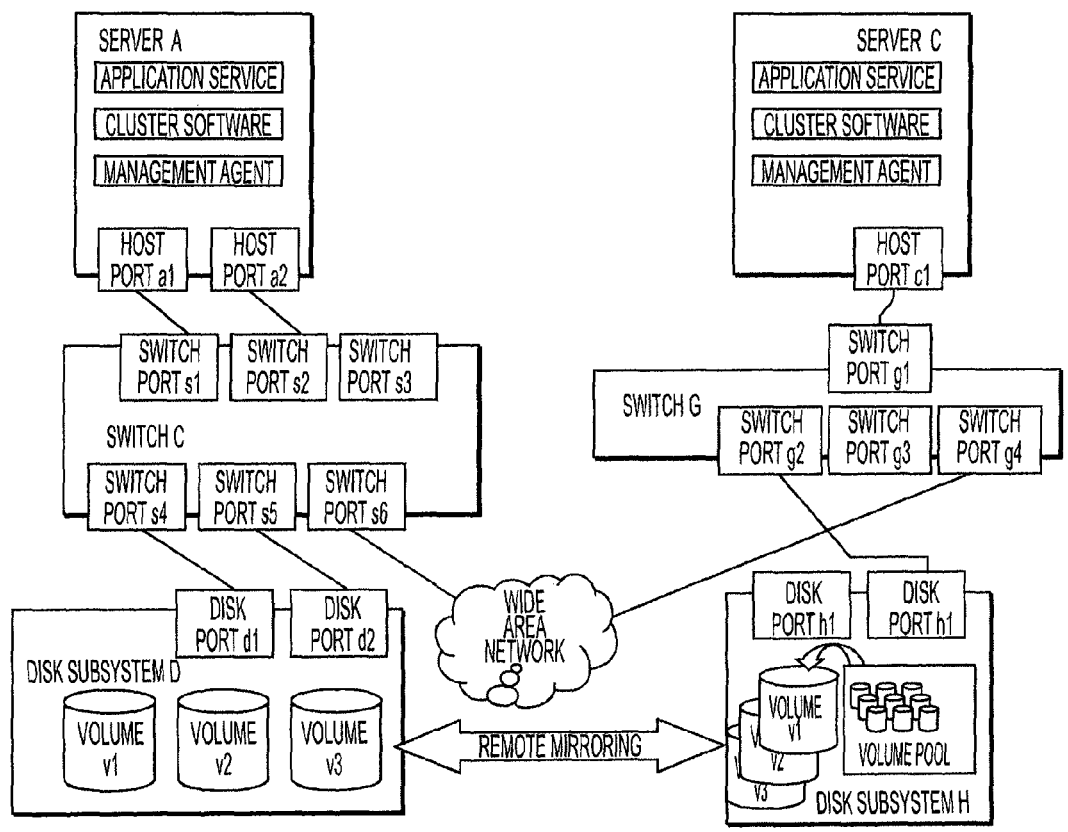
FIG. 8 depicts a visual configuration diagram that may be presented to the user.

Under semi-automatic configuration, establishment of a clustering system also begins with step 702, which has been discussed previously. Next, in step 716, information on the current system is gathered. This step is similar to step 706 discussed above. In step 718, one or more potential selections of appropriate equipment and/or arrangements to be used for creating the secondary node is presented to the user. The user is given the opportunity to select the various equipment and/or arrangements to be used in creating the secondary node. In step 720, the user's selection is received and presented back to the user for confirmation. Here, a visual topology diagram such as the one shown in FIG. 8 may be presented to the user. FIG. 8 may also represent a simplified version of block diagram shown in FIG. 1 If the user confirms the selection, the process continues with step 712, which is has been described previously. If the user does not confirm the selection, the process loops back to step 618.

In addition, semi-automatic configuration may also take into account user-defined policies, as is done in the case of automatic configuration. Here, such policies may allow potential selections of equipment and/or arrangements presented to be narrowed, so that the user may be presented with a more focused set of potential equipment and/or arrangements from which to make a selection. Other features discussed above in relation to automatic configuration may be adopted for use with semi-automatic configuration, and vise versa. For example, the visual confirmation diagram discussed in relation to semi-automatic configuration may also be used with automatic configuration, in order to present the automatically selected equipment and or arrangement to the user for confirmation. Further, variations on the different steps shown in FIG. 7 may also be adopted.

FIG. 1 is a block diagram of a clustering system 100 in accordance with at least one embodiment of the present invention. Such a diagram would allow the user to visually inspect a proposed configuration for a clustering system. This provides an efficient way to present a proposed configuration to the user for confirmation.

Although the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A management server coupled to processor devices and storage devices, comprising:
   means for storing storage device information relating to the storage devices;
   means for storing mapping information between application programs executed by the processor devices and portions of storage implemented in the storage devices being utilized by the application programs;
   means for receiving a command specifying a first application program executed by a first processor device, from the application programs and the processor devices;
   means for specifying a first storage portion in a first storage devices from the storage devices, based on the mapping information; and
   means for specifying a candidate storage portion(s) in a candidate storage device(s) from the storage devices, based on the storage device information,
   wherein the candidate storage portion(s) is capable to store replica of data in the first storage portion.

2. A management server according to claim 1, further comprising:
   means for selecting one of the candidate storage portion(s) for storing the replica of data in the first storage portion by a remote mirroring executed by the first processor device or the first storage device.

3. A management server according to claim 2, further comprising:
   means for presenting information about the candidate storage portion(s) as candidate(s) to store the replica of data in the first application program.

4. A management server according to claim 3,
   wherein the first storage portion is a LU, and the one of the candidate storage portion(s) is another LU.

5. A management server according to claim 4,
   wherein the one of the candidate storage portion(s) is accessed by another processor device among the storage devices.

6. A replica configuration method for a management server coupled to a processor devices and a storage devices, comprising:
   storing storage device information relating to the storage devices;
   storing mapping information between application programs executed by the processor devices and portions of storage implemented in the storage devices being utilized by the application programs;

receiving a command specifying a first application program executed by a first processor device, from the application programs and the processor devices;

specifying a first storage portion in a first storage devices from the storage devices, based on the mapping information; and specifying a candidate storage portion(s) in a candidate storage device(s) from the storage devices, based on the storage device information, wherein the candidate storage portion(s) is capable to store replica of data in the first storage portion.

7. A replica configuration method according to claim 6, further comprising:

selecting one of the candidate storage portion(s) for storing the replica of data in the first storage portion by a remote mirroring executed by the first processor device or the first storage device.

8. A replica configuration method according to claim 7, further comprising:

presenting information about the candidate storage portion(s) as candidate(s) to store the replica of data in the first application program.

9. A replica configuration method according to claim 8, wherein the first storage portion is a LU, and the one of the candidate storage portion(s) is another LU.

10. A replica configuration method according to claim 9, wherein the one of the candidate storage portion(s) is accessed by another processor device among the storage devices.

11. A system comprising:

a management server;

storage devices implementing portions of storage; and a processor device executing application programs using the portions of storage, wherein the management server stores storage device information relating to the storage devices, and stores mapping information between the application programs and the portions of storage, wherein the management server executes to:

(A) receive a command specifying a first application program from the application programs;

(B) specify a first storage portion in a first storage devices from the storage devices, based on the mapping information; and (C) specify a candidate storage portion(s) in a candidate storage device(s) from the storage devices, based on the storage device information, wherein the candidate storage portion(s) is capable to store replica of data in the first storage portion.

12. A system according to claim 11, wherein the management server selects one of the candidate storage portion(s), and wherein the one of the candidate storage portion(s) stores the replica of data in the first storage portion by a remote mirroring executed by the first processor device or the first storage device.

13. A system according to claim 12, wherein the management server presents information about the candidate storage portion(s) as candidate(s) to store the replica of data in the first application program.

14. A system according to claim 13, wherein the first storage portion is a LU, and the one of the candidate storage portion(s) is another LU.

15. A system according to claim 14, wherein the one of the candidate storage portion(s) is accessed by another processor device.

16. A non-transitory computer readable medium with an executable program stored thereon, wherein the executable program causes a management server coupled to processor devices and storage devices to perform a method, the method comprising the steps of:

storing storage device information relating to the storage devices;

storing mapping information between application programs executed by the processor devices and portions of storage implemented in the storage devices being utilized by the application programs;

receiving a command specifying a first application program executed by a first processor device, from the application programs and the processor devices;

specifying a first storage portion in a first storage devices from the storage devices, based on the mapping information; and specifying a candidate storage portion(s) in a candidate storage device(s) from the storage devices, based on the storage device information, wherein the candidate storage portion(s) is capable to store a replica of data in the first storage portion.

17. A non-transitory computer readable medium according to claim 16, further comprising:

selecting one of the candidate storage portion(s) for storing the replica of data in the first storage portion by a remote mirroring executed by the first processor device or the first storage device.

18. A non-transitory computer readable medium according to claim 17, further comprising:

presenting information about the candidate storage portion(s) as candidate(s) to store the replica of data in the first application program.

19. A non-transitory computer readable medium according to claim 18, wherein the first storage portion is a LU, and the one of the candidate storage portion(s) is another LU.

20. A non-transitory computer readable medium according to claim 19, wherein the one of the candidate storage portion(s) is accessed by another processor device among the storage devices.

* * * * *